United States Patent [19]
Parsons

[11] Patent Number: 5,644,950
[45] Date of Patent: *Jul. 8, 1997

[54] HEAVY-DUTY MECHANICAL OSCILLATOR

[75] Inventor: John D. Parsons, Bethel, Conn.

[73] Assignee: Norco, Inc., Georgetown, Conn.

[*] Notice: The term of this patent shall not extend beyond the expiration date of Pat. No. 5,592,852.

[21] Appl. No.: 560,375

[22] Filed: Nov. 17, 1995

[51] Int. Cl.$^6$ ............................. F16C 19/54; F16H 25/12
[52] U.S. Cl. ..................... 74/57; 74/424.8 R; 74/459; 74/465; 384/128
[58] Field of Search .................. 74/57, 58, 59, 74/424.8 R, 424.8 B, 459, 465; 384/128, 571

[56] References Cited

U.S. PATENT DOCUMENTS

| | | | |
|---|---|---|---|
| 2,258,114 | 10/1941 | Johnson | 74/57 |
| 3,296,880 | 1/1967 | Maroth | 74/424.8 |
| 3,308,674 | 3/1967 | Maroth | 74/424.8 |
| 3,648,535 | 3/1972 | Maroth | 74/465 X |
| 3,721,161 | 3/1973 | Bobst | 384/128 |
| 3,766,788 | 10/1973 | Metz | 74/441 |
| 3,766,800 | 10/1973 | Kennedy | 74/424.8 |
| 3,779,094 | 12/1973 | La Barre | 74/424.8 R |
| 3,792,616 | 2/1974 | Wentzel | 74/57 |
| 3,803,926 | 4/1974 | Winter | 74/424.8 B X |
| 3,844,177 | 10/1974 | Bourassa | 74/424.8 B X |
| 3,890,015 | 6/1975 | Harbottle | 384/571 |
| 4,008,625 | 2/1977 | Malhotra | 74/441 |
| 4,022,076 | 5/1977 | Metz | 74/441 |
| 4,031,765 | 6/1977 | Metz | 74/57 |
| 4,198,872 | 4/1980 | Metz | 74/57 |
| 4,199,999 | 4/1980 | Metz | 74/424.8 NA |
| 4,274,296 | 6/1981 | Miller et al. | 74/424.8 R |
| 4,343,200 | 8/1982 | Allworth | 74/57 |
| 4,693,131 | 9/1987 | Teramachi | 74/424.8 B |
| 4,730,503 | 3/1988 | Rosenthal | 74/58 |
| 5,191,805 | 3/1993 | Parsons | 74/459 |

*Primary Examiner*—Charles A. Marmor
*Assistant Examiner*—Troy Grabow
*Attorney, Agent, or Firm*—H. Gibner Lehmann; K. Gibner Lehmann

[57] ABSTRACT

A heavy-duty mechanical/oscillator utilizes a shaft having an endless cam groove in its periphery, and a nut body carried by and slidable along the peripheral portion of the shaft. A roller pin on the nut body, extends into and engages a wall of the endless groove. The roller pin's nose portion is conical, whereby the pin is subjected to oblique loading having both intense radial and lesser axial components. Paired anti-friction roller bearings carried by the nut body in turn rotatably mount the roller pin. The bearings include a primary oblique-loading roller bearing disposed adjacent the nose portion of the roller pin and oriented to counter the intense radial forces and lesser axial forces experienced by the nose portion, and a secondary oblique-loading roller bearing located adjacent the primary bearing and engaged with a tail portion of the roller pin. The secondary roller bearing is oriented to mainly counter radial forces experienced by the nose portion. The device is characterized by extreme ruggedness, and long life expectancy over extended periods of operation.

10 Claims, 6 Drawing Sheets

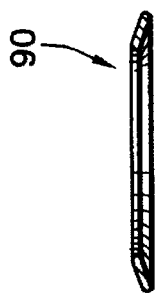
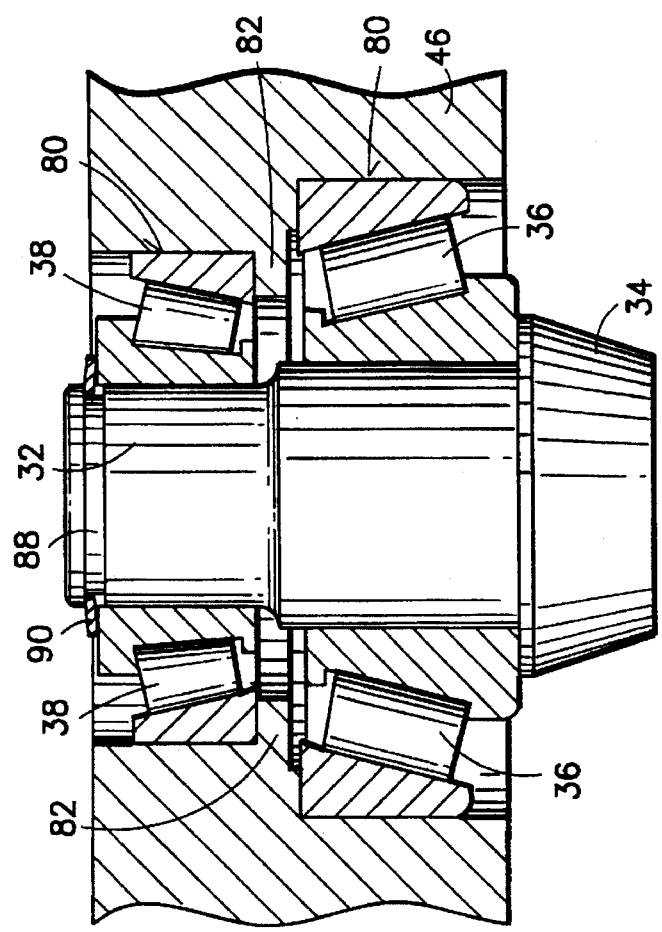
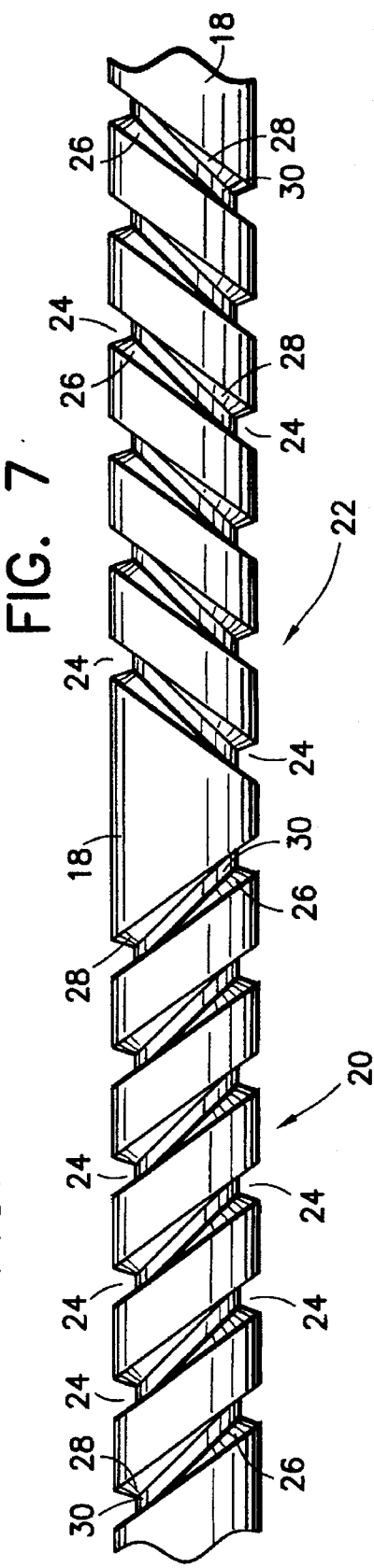

HEAVY-DUTY MECHANICAL OSCILLATOR

NO CROSS REFERENCES TO RELATED APPLICATIONS

Statement as to rights to inventions made under federally-sponsored research and development.

Research and development of the present invention and application have not been Federally-sponsored, and no rights are given under any Federal program.

BACKGROUND OF THE INVENTION

1. Field of the Invention

This invention relates generally to improvements in mechanical oscillators or traverse mechanisms, and more particularly to improvements in the reciprocator illustrated and described in U.S. Pat. No. 3,792,616 entitled RECIPROCATING DRIVE, having common ownership with the present application.

The entire disclosure of U.S. Pat. No. 3,792,616 is specifically incorporated herein, by reference.

2. Description of the Related Art Including Information disclosed under 37 CFR Sections 1.97–1.99

The following patents are hereby made of record, as being related to the field to which the present invention pertains:

| U.S. Pat. Nos.: | | |
| --- | --- | --- |
| 2,258,114 | 3,296,880 | 3,308,674 |
| 3,648,535 | 3,766,788 | 3,766,800 |
| 3,779,094 | 3,803,926 | 3,844,177 |
| 4,008,625 | 4,022,076 | 4,031,765 |
| 4,198,872 | 4,199,999 | 4,274,296 |
| 4,343,200 | 4,693,131 | 4,730,503 |
| 5,191,805 | | |

British Patent No. 1044 dated Jan. 15, 1907
French Patent No. 526,586

U.S. Pat. No. 3,792,616 above identified discloses a mechanical oscillator comprising a turnable shaft having two parallel, endless tracks or grooves of loop-like configuration, and a nut body carrying radially-disposed rollers on bearings. The path of each track generally defines an ellipse. The rollers each have a nose which engages the walls of the respective grooves as the shaft is turned, such that the nut undergoes reciprocating movement as the shaft is driven. Centralizers in the form of needle bearings are provided at opposite ends of the nut body, to maintain the alignment between the axis of the latter and that of the shaft.

The patented construction has enjoyed a degree of commercial success, and has been found to operate satisfactorily for certain specific applications.

However at high speeds, problems are encountered with roller slippage and excessive wear, even with appropriate lubrication of the relatively moveable parts. In particular, with such arrangements the inertia of the nut body during reversal, must be overcome at each end of the reciprocating stroke, causing relatively large (though momentary) forces to be applied to the individual rollers and their respective bearings at the points of reversal.

In addition, more serious is the problem of slippage of the individual rollers on the walls of the tracks as reversal is occurring. In particular, with the disclosed construction, both rollers tend to turn in one direction about their respective axes for one-half of the reciprocating cycle, and then, by virtue of their shift to engagement with the opposite faces or walls of the grooves, each roller is suddenly subjected to a force which tends to cause it to suddenly reverse its direction of turning.

As can be readily appreciated, in practice, sudden or instantaneous reversal of the direction of turning of the individual rollers does not readily occur. Instead, there arises some combination of sliding of the individual rollers against the opposing groove wall, followed by eventual reversal of the direction of rotation, assuming that the speeds involved are sufficiently slow to permit the inertia of the rollers to be overcome at all. As a consequence, excessive wear occurs, and the anti-friction characteristic of the oscillator, as intended by the provision of the anti-friction bearings for each roller, is seen to be largely lost, or at best, significantly diminished.

An early use of thread-engaging rollers in a helical-type screw is disclosed in British Patent No. 1044 issued in January, 1907, and French Patent No. 526,586 issued in October, 1921.

Refinements in the constructions noted in the previous paragraph appear in U.S. Pat. Nos. 3,296,880; 3,308,674; 3,648,535; and 4,274,296. In these patents there is disclosed a number of anti-friction mechanical drive constructions involving Acme-type helical thread forms, and nut structures comprising various type of anti-friction rollers, and including bearings for the rollers. Several of the disclosed constructions have enjoyed considerable commercial success over the years.

Various improvements to some of these patented structures have been devised. In particular, in U.S. Pat. No. 3,766,788, anti-friction rollers are housed in bushing assemblages which have outer cylindrical walls that are eccentric with respect to the respective roller housed therein. The arrangement is such that each bushing can be adjustably turned in its respective radial socket in the nut body, so as to effect a lateral shifting of the roller. This enables the user to accommodate slight variations in thread pitch which are encountered during normal manufacturing operations involved in fabrication of the screw.

Another arrangement is shown in U.S. Pat. No. 3,766,800, which features a nut/screw combination having anti-friction rollers, wherein the nut, in addition to the thread-engaging rollers, has conventional internal threads which are purposely made. undersize, and which do not normally engage the screw threads unless an unusually high axial load is applied between the nut and screw. Under such high loads, the rollers become retracted to the extent that the fixed thread form of the nut engages the screw, thereby to alleviate excessive loading on the rollers, and to prevent a catastrophic failure of the nut/screw which otherwise might result.

Still other variations on the patented devices noted above are illustrated in U.S. Pat. Nos. 4,008,625; 4,198,872; 4,199,999; and 5,191,805. In U.S. Pat. No. '625, two nut components or parts are cascaded along a screw, each component having a radial roller which is spring biased into engagement with a wall of the thread groove. A coil spring carried by one of the nut parts, in turn applies an additional spring bias to the nut components so as to cause the roller of one component to "hug" one wall of the thread groove, and the roller of the other component to "hug" the opposite wall of the groove, thereby to minimize backlash of the cascaded nut assembly.

U.S. Pat. No. 4,198,872 discloses a modified anti-friction nut adapted for relatively light loads, and with a more conventional helical thread form. In place of anti-friction rollers, the disclosed construction utilizes balls as the thread-engaging elements. Slippage of the balls on the thread occurs as the screw is turned. Each ball is carried in a radially-extending socket constituted as a bushing having a cup-shaped ball seat.

An improvement in the construction of U.S. Pat. No. 4,198,872 above identified is shown in U.S. Pat. No. 4,199,999. This latter device incorporates a special cage and housing in order to hold captive a series of thread-engaging balls. The cage and housing telescope with one another, and the resultant structure was found to be more economical to manufacture than some of the prior anti-friction drives of the type utilizing balls as anti-friction elements.

A further simplified anti-friction drive for a screw having a modified Acme thread is illustrated in U.S. Pat. No. 5,191,805. A radial roller is provided on a nut body, supported on inner and outer ball bearings. The use of ball bearings has been found to be especially economical, since their cost is quite low, and they are readily available in the marketplace and at very competitive prices.

Modified structures employing anti-friction rollers are shown in U.S. Pat. No. 3,779,094, which utilize a diamond-thread screw in place of a helical-thread type screw. Special roller cartridges are arranged to be slidable on the nut body, thereby permitting lateral shifting of selected rollers, which results in the capability of reversal of the nut at either one of the opposite ends of the screw thread, or at selected points along the screw, namely at the location of the groove intersections of the diamond thread.

Other anti-friction constructions illustrating the use of balls as thread-engaging elements are shown in U.S. Pat. Nos. 4,022,076 and 4,031,765. In U.S. Pat. No. '076, there is illustrated an anti-backlash mechanism to reduce looseness between a nut and screw. U.S. Pat. No. '765 constitutes an improvement in U.S. Pat. No. 3,779,094, in that the use of rollers has been eliminated, and thread engaging balls employed to engage the screw, while still maintaining the capability of reversal of the nut at the ends of the screw thread.

U.S. Pat. No. 4,343,200 illustrates a reversing mechanism employing a diamond thread screw, and a special reversing collar that can be selectively applied to the diamond thread at various points therealong, so as to enable the direction of travel of the nut to be reversed at any one of a plurality of points along the thread. The collar in effect, provides a selectively installable and removable abutment or "reversing groove" at any one of a number of different points along the length of the screw.

Somewhat different arrangements for providing reciprocating drives are illustrated in U.S. Pat. Nos. 3,803,926 and 4,693,131. Both of the disclosed devices utilize what is known in the industry as "ball screws". U.S. Pat. No. '926 involves a drive shaft having oppositely-threaded portions, i.e. both left- and right-hand threads, whereas U.S. Pat. No. '131 involves a ball screw for positioning a worktable, the mechanism utilizing two stepping motors that are arranged to be selectively either additive or differential as to the speed at which the table is driven.

Other reciprocating systems employing oppositely-threaded sections of a turnable drive shaft are disclosed in U.S. Pat. Nos. 3,844,177 and 4,730,503.

Finally, U.S. Pat. No. 2,258,114 discloses a box cam arrangement utilizing a bearing-mounted roller on a reciprocating carriage, and wherein the drive cam is provided with a spring mounting that tends to absorb impulse-type forces which would otherwise be transmitted to the cam follower portion of the box cam.

In the case of the anti-friction drive constructions noted above and of the type which employ either a simple helical thread or a diamond thread, the problem of sudden reversal in the axial movement of a nut was not generally addressed. In most of the other patented devices discussed above, reversal occurs typically at relatively low operational speeds.

Thus, the problem of inertia of the nut body at the point of reversal remains unsolved, to a large extent. Also, the problem of inertia of a roller element giving rise to wear of either the roller or the thread surface, has not been adequately discussed in the prior art noted above.

Where high speed operation is required and where there arises the need to suddenly reverse the direction of rotation of a roller in order to minimize sliding contact between it and a thread groove wall, the matter of impulse-type torque or forces applied to the individual rollers must be considered. Where a non-sliding contact cannot be realizeable for reasons of excess speed, or high load, there occurs excessive wear, which more often than not, proves to be intolerable; in addition, where sliding of a roller occurs, the resulting friction not only defeats the anti-friction characteristic of the mechanism, but in addition, creates heat.

As a consequence, there has arisen a need for a high-speed, relatively long-life oscillator mechanism which will resist wear and operate in a satisfactory manner over prolonged time periods. In addition, there has arisen a need for an oscillator construction which can be easily serviced, and where replacement of parts on a routine basis, somewhat analogous to periodic maintenance, can be realized.

SUMMARY OF THE INVENTION

Accordingly, it is one object of the present invention to provide a novel and improved, especially heavy-duty mechanical oscillator which is both simple in its structure, and especially rugged and reliable in operation over extended periods of use.

A related object of the invention is to provide an improved heavy-duty mechanical oscillator of the kind noted, which lends itself to periodic inspection and maintenance, even in the field, with a minimum of down-time and in a cost-effective manner.

Still another object of the invention is to provide an improved heavy-duty mechanical oscillator as above characterized, which utilizes a unique assembly combination comprising anti-friction bearing assemblages of the oblique-loading, roller type, that are readily available in the marketplace and which can be obtained at especially low cost.

Yet another object of the invention is to provide an improved heavy-duty mechanical oscillator as set forth above, which has a significantly increased load capacity.

Still another object of the invention is to provide an proved mechanical oscillator as characterized above, wherein anti-friction roller pins carried on a nut body always move unidirectionally for a given sense of relative rotation between the shaft and nut, thereby reducing wear on the roller pins and on the thread groove formation, by eliminating the necessity for the roller pins to reverse direction suddenly at one end of a reciprocating stroke, as occasioned by an impulse-type force applied thereto.

A still further object of the invention is to provide an improved heavy-duty mechanical oscillator of the kind indicated, wherein multiple sets of roller pins are utilized, one set functioning to drive the nut portion of the oscillator in one axial direction, and the other set functioning to drive the nut portion in the opposite direction, the rollers of each set having a sense of rotation which is similar to each other, and the rollers of each set turning in a direction which is opposite to that of the other set, in a clockwise/ counterclockwise sense when viewed from the nose of the roller.

A still further object of the invention is to provide an improved heavy-duty mechanical oscillator of the kind indicated, which is especially adapted for relatively high-speed operation, and is well suited to overcome the problems of inertia that are otherwise encountered in the case of a relatively high mass object being required to reverse its direction of movement in an impulse-type situation. The oscillator can thus operate reliably and without failure, and without experiencing excessive wear of the various components.

Yet another object of the invention is to provide an improved mechanical oscillator as above described, wherein a desirable balanced drive force is applied by the shaft to the nut body, by virtue of radially-extending roller pins that are oppositely directed or oriented, so as to minimize undesirable lateral forces between the shaft and nut body.

The above objects are accomplished by a heavy-duty mechanical oscillator comprising in combination, a shaft having an end-less cam groove in its periphery, and a nut body carried by and slidable along the peripheral portion of the shaft. A roller pin is carried by the nut body, having a nose portion extending into and engaging a wall of the endless groove and having a tail portion disposed deeply in the nut body. The nose portion is conical whereby the roller pin is subjected to load forces comprised of both radial and axial components. In addition, there are provided paired anti-friction roller bearings carried by the nut body, the bearings carrying the roller pin and comprising a primary oblique-loading or tapered roller bearing disposed adjacent the nose portion of the roller pin and oriented to counter high radial forces and lesser axial forces experienced by the nose portion, and a secondary oblique-loading or tapered roller bearing located adjacent the primary bearing and engaged with a tail portion of the roller pin. The secondary roller bearing is oriented to mainly counter radial forces experienced by the nose portion.

The arrangement is such that the primary bearing withstands the forces applied to the roller pin by the shaft, minimizing the possibility of fractures developing as a consequence of metal fatigue, over extended periods of operation.

This, and other objects of the invention, are also accomplished by a unique combination of tandem-mounted roller pins, along with multiple paired roller bearings for each roller pin, which are oriented especially to handle heavy, radial and axial shock loads of an unusual nature, such as are encountered in connection with heavy drilling equipment of the type utilized in drilling oil wells and the like.

An important feature of the oscillator of the present invention lies in the fact that the roller pin undergoes solely unidirectional rotation under normal operation, for a given sense of rotation of the shaft with respect to the nut body, thereby eliminating slippage and wear between the nose portion of the roller pin and the walls of the endless groove of the shaft; such wear was frequently a problem in prior, known oscillator mechanisms.

Other features and advantages will hereinafter appear.

BRIEF DESCRIPTION OF THE DRAWINGS

In the drawings, illustrating a preferred embodiment of the invention:

FIG. 4 is a fragmentary axial section, greatly enlarged, of one of the roller pins and oblique-loading roller bearing pairs associated therewith, mounted in position in the respective carrier block of the oscillator.

FIG. 5 is an axial section of a spring retainer washer utilized in the oscillator of FIGS. 1A and 1B.

FIG. 7 is a front elevation of the shaft portion of the mechanical/scillator of FIGS. 1A, 1B and 2.

DESCRIPTION OF THE PREFERRED EMBODIMENTS

Figure 1A:
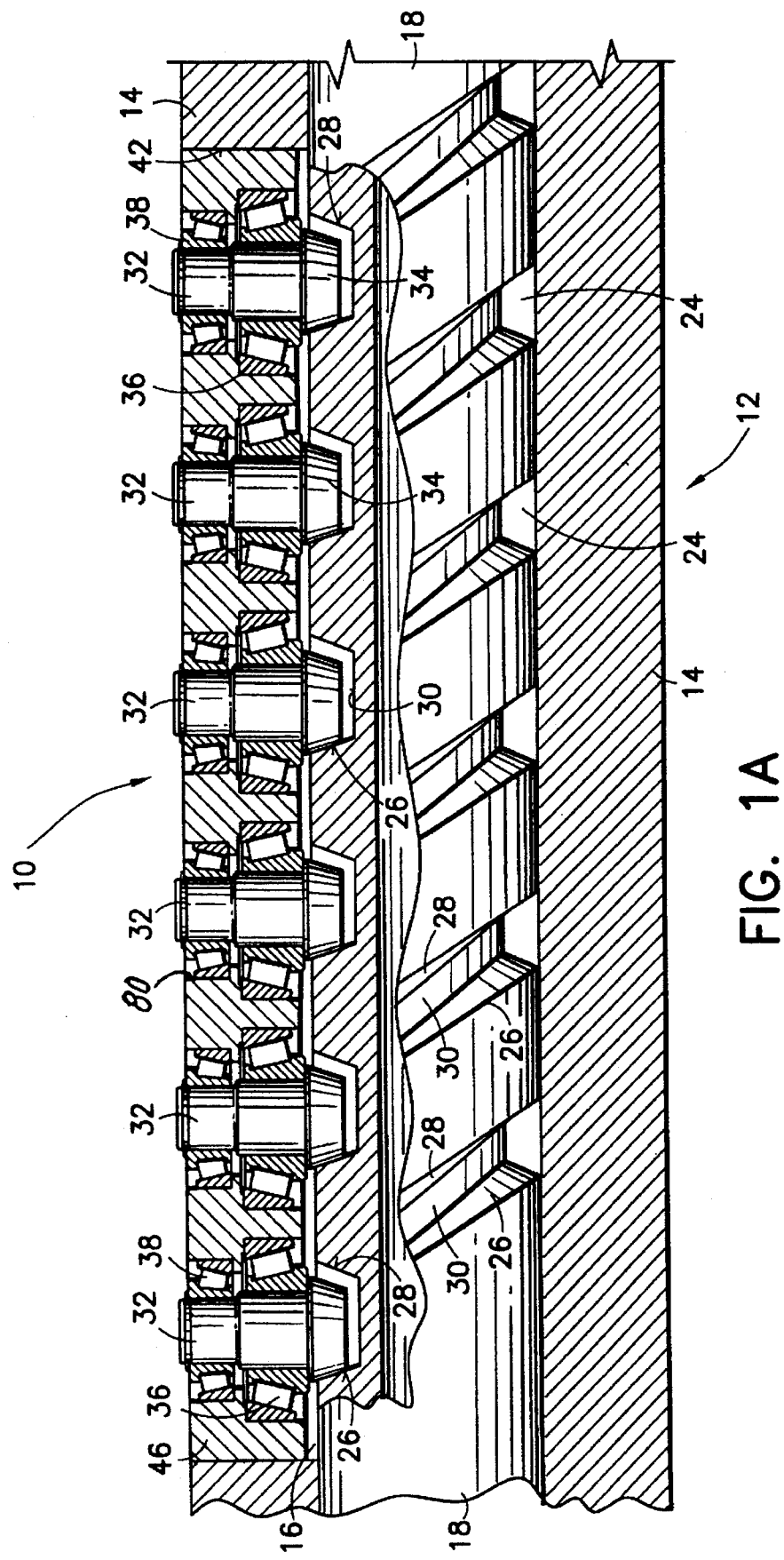
FIGS. 1A and 1B taken together, are an axial section of the improved heavy-duty mechanical oscillator of the present invention, particularly showing a shaft having two sets of oppositely-directed endless tracks or grooves, and a nut surrounding the shaft and having a plurality of roller pins extending into its bore, for engagement with the walls of the shaft grooves, respectively.
Figure 1B:
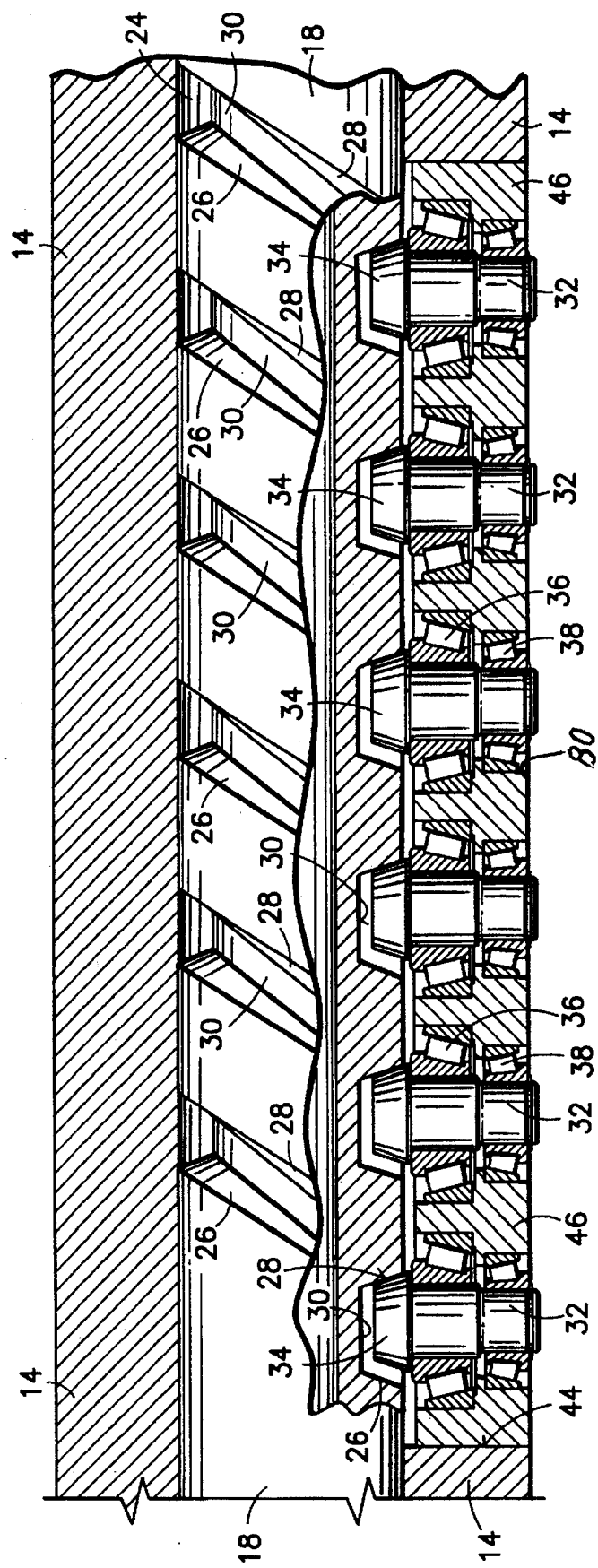
Figure 2:
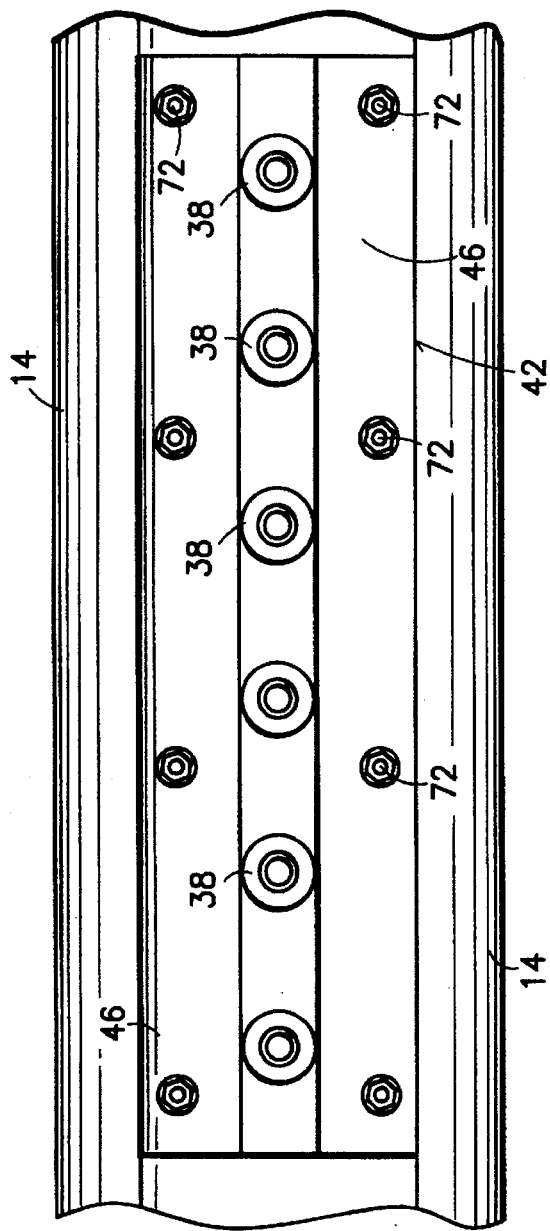
FIG. 2 is a fragmentary top plan view of the mechanical oscillator of FIG. 1.

Referring first to FIGS. 1A and 1B, which are intended to be placed end-to-end in order to illustrate a complete assembly, the improved heavy-duty mechanical oscillator of the invention basically comprises a continuously rotatable shaft and a nut thereon, which is slidably mounted and which reciprocates between given, fixed limits as the shaft continues to turn. The oscillator is generally designated by the numeral 10. The nut 12 comprises an elongate nut body 14, having an axial bore 16 through which the shaft, designated 18, extends.

In accordance with the present invention there is provided a novel combination of cooperable drive elements on the shaft 18 and nut body 14, by which there is realized a surprisingly high or heavy-duty load capacity while at the same time featuring low-friction operation and significantly improved reliability over that previously obtainable with other, known oscillator constructions.

In accomplishing this improved operation, as shown in FIG. 7, the shaft 18 is provided with two sets 20 and 22 of multiple, axially-spaced endless or loop-shaped cam tracks or grooves 24 in its periphery, the second set 22 being rotationally oriented 180 degrees from the first set 20, and each of the two sets consisting of up to six of the individual endless grooves 24 which are disposed one after another in parallelism. The grooves 24 each have divergent, sloped facing side walls 26 and 28, and a bottom wall 30. In FIG. 1A, the walls 26 comprise the driving walls, and they are opposite to the companion, non-driving walls 28 with which they respectively form the divergent configurations of the grooves 24. In FIG. 1B, the walls 28 comprise the driving walls, as will be explained further below.

By the invention the nut body 14 carries two oppositely-disposed sets of roller pins 32, there being six pins 32 in each set in the embodiment of the invention shown herein. The pins 32 have conical nose portions 34 respectively that are received in the grooves 24. The roller pins 32 are carried in the nut body 14 in a unique manner, utilizing sets of paired anti-friction, oblique-loading or tapered roller bearings 36 and 38, disposed side-by-side, and particularly oriented so as to counter or withstand, both high-magnitude radial forces applied to the roller pins 32 by the shaft 18, and to a lesser extent, lower-magnitude axial forces applied to the bearings 38. Such forces arise as a consequence of the tapered nose configurations 34 of the roller pins 32, which latter tend to be cammed radially outwardly of the shaft 18 by the action of the tapered groove walls 26, 28 thereof. The bearings 36 are disposed adjacent to the nose portions 34 of the roller pins, whereas the bearings 38 are disposed on the tail portions or small-diameter shanks of the roller pins 32, respectively. The bearings 36 are hereinafter referred to as primary oblique-loading roller bearings, and those designated 38 are referred to as secondary oblique-loading roller bearings, the latter being somewhat smaller in physical size than the primary bearings. One set of roller pins 32 is shown in FIG. 1A, with the second set being shown in FIG. 1B. All the roller pins 32 are coplanar as to their axes, the axes being axially spaced from one another along the axis of the shaft 18.

Figure 3:
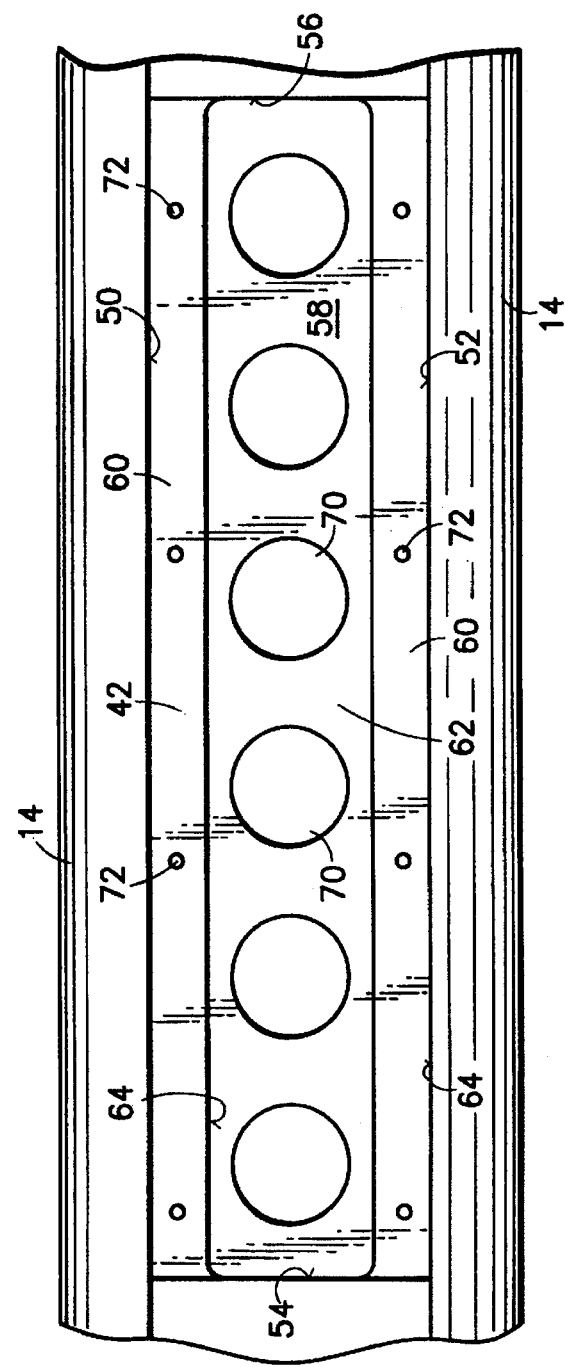
FIG. 3 is a fragmentary top plan view of the nut of the mechanical oscillator, but with a carrier block thereof removed, revealing an external recess which the carrier block normally occupies during operation.
Figure 6:
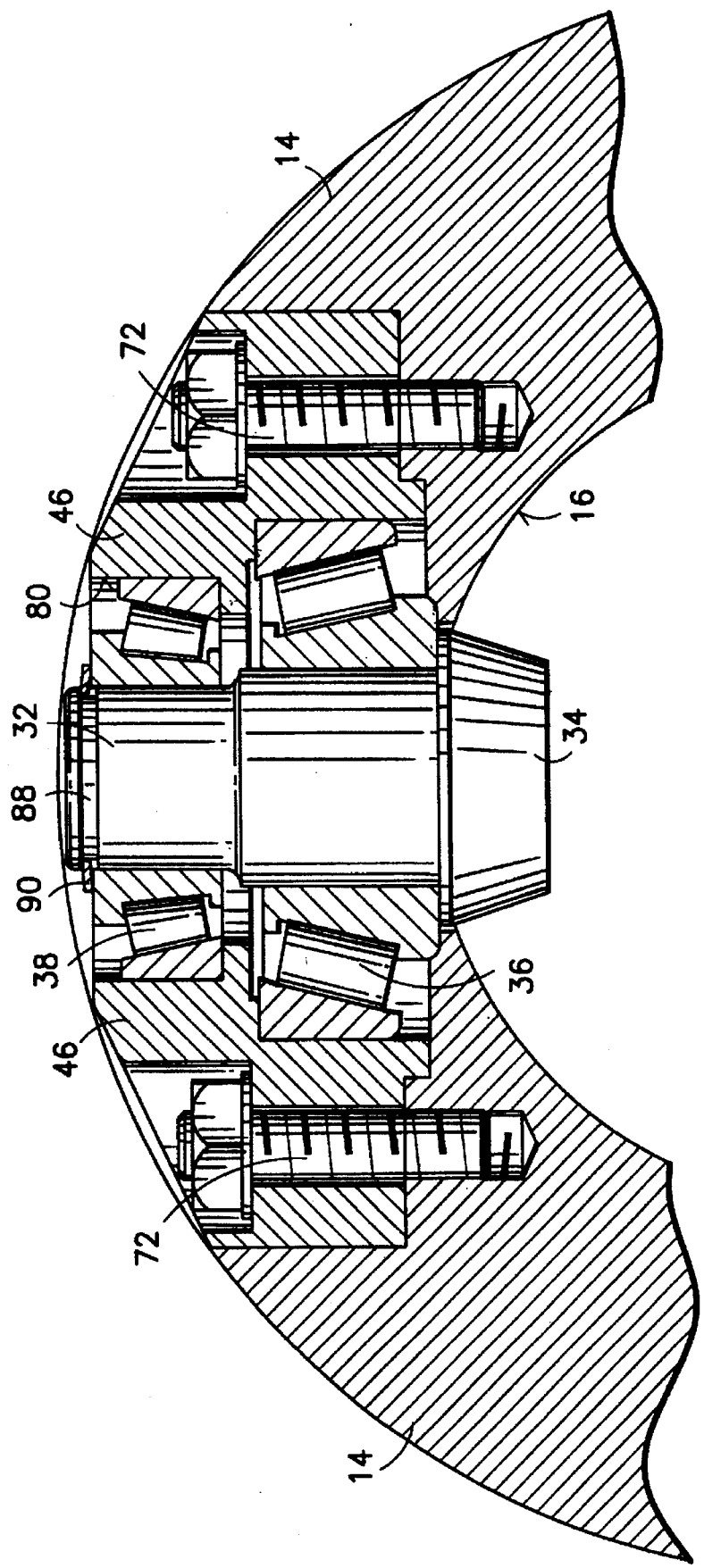
FIG. 6 is a fragmentary transaxial section, greatly enlarged, of the mechanical oscillator of FIGS. 1A and 1B.

Referring again to FIGS. 1A, 1B and 4, the nose portions of the roller pins 32 are disposed in the bore 16 of the nut body 14, and are received in the respective endless grooves 24 of the shaft 18, in engagement with either one or the other of the walls 26, 28 thereof. In accomplishing the novel heavy-duty mounting for the roller pins 32, the nut body 14 has two external, longitudinal recesses 42, 44 respectively, in which there are secured two carrier blocks 46, respectively. FIG. 3 particularly illustrates the one recess 42 which is shown in FIG. 1A; the recess 44 is shown in FIG. 1B. Each of the two carrier blocks 46 constitute in effect, a part of the nut body 14, and each block with its associated roller pins 32 is removable from the nut body 14 as a unitary sub-assembly, to facilitate inspection and servicing, as well as replacement after an intended period of operation, as required.

FIG. 3 shows the longitudinal recess 42 which receives the carrier block 46 of FIG. 1A. The recess 42 has oppositely disposed longitudinal side walls 50, 52, transverse end walls 54, 56, and a bottom wall 58 which includes two fringe land portions 60 and an inner depressed portion 62. Shoulders 64, FIG. 3, position the bearing-carrier block 46. Holes 70 provide clearance for the nose portions 34 of the roller pins 32. Studs 72 secure the block 46 to the nut body 14.

Referring again to FIGS. 1A, 1B, and 4, the carrier blocks 46 have multiple transverse bores 80 in which the roller pins 32 are carried. Disposed in the respective bores 80 are the paired anti-friction bearings comprising the primary oblique-loading roller bearings 36 and secondary oblique-loading roller bearings 38. Each roller pin 32 has a large diameter portion carried by the inner race of the primary bearing 36, and a smaller diameter portion carried by the secondary bearing 38.

In accomplishing the retention of the bearings 36, 38 and roller pins 32 in the respective bores 80, the latter have annular shoulder portions 82, FIG. 4, with annular surfaces engageable with the respective bearings. The roller pins 32 have grooves 88 to receive spring retainer washers or means 90 which hold captive the bearings 36, 38 and pins 32. As shown in FIG. 4, the inner race of the primary roller bearing 36 is in abutting relation with the nose portion 34 of the roller pin 32, and the outer race abuts the shoulder portion 82. The outer race of the secondary bearing 38 abuts the shoulder portion 82, and the inner race is engaged by the spring washer 90. Thus, the primary bearing 36 and secondary bearing 38 are in effect, sandwiched between the nose portion 34 of the pin 32 and the spring washer 90, retaining the pin 32 fixed radially.

The shaft 18 is always turnably driven in one direction. The roller pins 32 in FIG. 1A continuously engage and roll on the groove walls 26 which constitute driving walls of the oscillator and sustain a maximum load when the nut body 14 is being driven toward the right in this figure. Similarly, the pins 32 in FIG. 1B continuously engage the groove walls 28 which thus also constitute driving walls of the oscillator. These latter pins sustain a maximum load when the nut body 14 is being driven toward the left in this figure. Due to the fact that any particular roller pin 32 always engages solely either one wall 26 or the other wall 28 of a groove 24, each roller pin 32 always turns about its respective axis in the same direction at all times. That is, none of the twelve roller pins 32 must reverse direction at any time, even at the end of a reciprocating stroke. The pins 32 can be thought of as turnable drive members in the drive train 24, 32, 36 and 38 of the oscillator.

Such an arrangement has a distinct advantage over many of the devices of the prior art, including that disclosed in U.S. Pat. No. 3,792,616 mentioned in the preamble of the present specification. In most prior structures and where high speeds were involved, the inability of a roller pin to instantaneously reverse its direction of rotation has rendered impractical, a workable, high-speed mechanical reciprocator that is capable of operation of the kind disclosed above in accordance with the present invention.

Thus, it can be seen that I have provided a novel and improved heavy-duty mechanical oscillator which is both simple in its structure, and especially rugged and reliable in use, even over extended periods of time.

The feature of unidirectional rotation of each roller pin 32 over the complete reciprocating stroke, results in greatly reduced wear, and permits higher speed operation than that obtainable with constructions where roller pin reversal was required, typically at the end of a reciprocating stroke.

The unique mounting provided by the oblique-loading or tapered roller bearings 36, 38 has been found to withstand the relatively large radial and axial forces applied to the roller pins 32, to the end that extended life expectancy can be realized, even under relatively rugged conditions of use.

The utilization of sets of up to six roller pins 32 in each carrier block tends to equalize the relatively heavy loads which may be encountered, thereby minimizing excessive loading on one roller pin/roller bearing pair, which might otherwise lead to premature wear and/or failure of an individual unit.

Inspection, or servicing of the individual roller pin assemblages is greatly facilitated by the provision of the carrier blocks 46. That is to say, periodic maintenance can be readily accomplished by merely loosening eight nuts securing the carrier block, removing the block, and substituting a replacement unit. Down time is thereby minimized, which is important for many applications. Also, the disclosed arrangement lends itself to servicing in the field, largely eliminating the need to remove large pieces of equipment and ship them to a remote facility in the event of a need for servicing.

The oblique-loading, tapered roller bearings utilized in the device of the present invention have been especially selected to effectively handle the high lateral and axial thrust experienced by the roller pins, as typically encountered in high speed operation of the oscillator. Simple ball and roller bearings, have in many cases, proved to be inadequate to withstand the rigors of the operating environment in which the present device is used.

Figure 8:
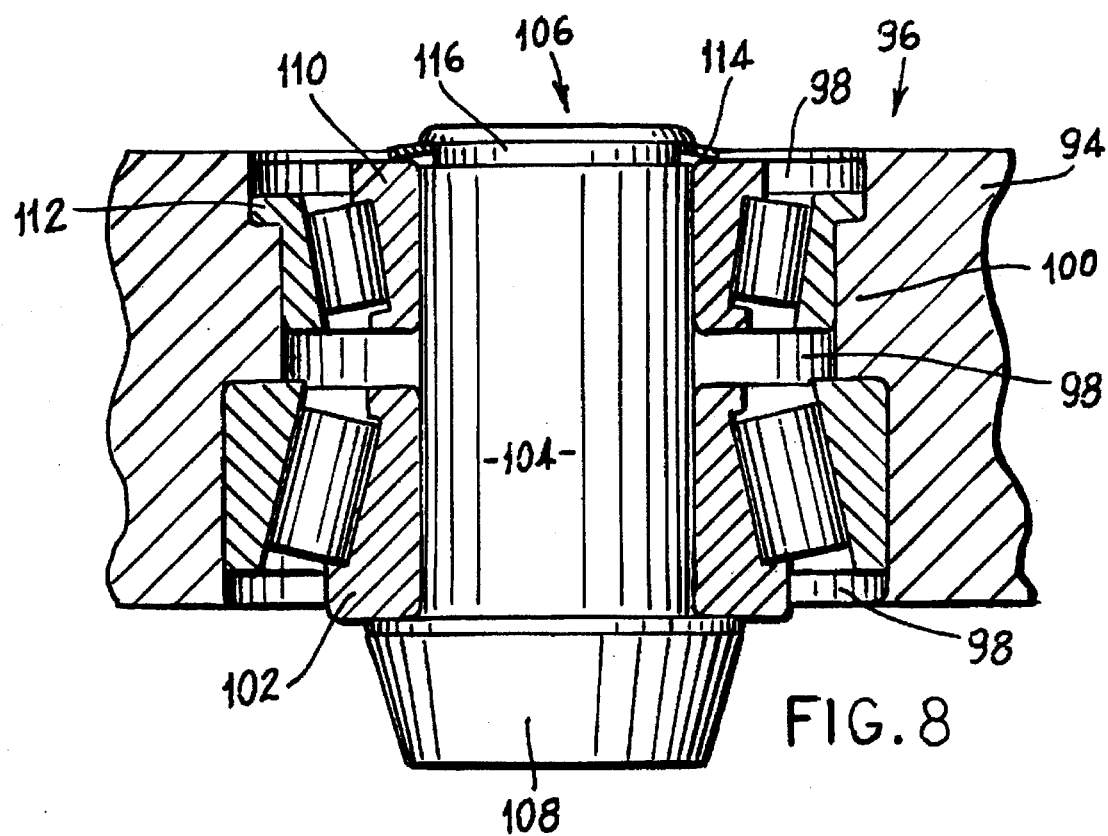
FIG. 8 is a view like that of FIG. 4, but illustrating another embodiment of the invention.

Another embodiment of the invention is illustrated in FIG. 8. This embodiment differs from the previous construction in that flanged bearings are utilized, together with roller pins whose shanks are smooth or straight as distinguished from stepped or shouldered. Also, the carrier block for the bearings has been simplified by eliminating shoulders in the block.

The carrier block 94 constitutes part of the assemblage comprising the nut body which latter is generally designated by the arrow 96. The block 94 has through bores, one such bore 98 being shown in the figure. Intermediate its ends the bore 98 has a shoulder portion 100 against which a primary oblique-loading roller bearing 102 is positioned. The bearing 102 receives the shank or tail portion 104 of a roller pin 106 which has a conical nose portion 108 engaged with the inner race of the bearing 102.

The shank 104 of the roller pin is smooth, having a single diameter on which there is also carried a secondary oblique-loading roller bearing 110 having an external flange 112.

The bearing 110 snugly fits in the shoulder portion 100 of the carrier block 94, with the flange 112 engaged with the upper face (as viewed in FIG. 8) of the shoulder.

A spring retainer washer 114 disposed in a groove 116 of the shank 104 bears against the inner race of the secondary bearing 110.

The rollers of the bearing 110 make a lesser angle with the axis of the pin 106 than the angle made by the rollers of the primary bearing 102, whereby the bearing 110 is oriented to counter high radial forces and lesser axial forces experienced by the nose portion 108 of the roller pin 106 as distinguished from the primary bearing 102 which has rollers of greater angularity and is thus oriented to counter increased axial forces experienced by the nose portion 108 of the pin, and to counter to a lesser degree radial forces experienced by the nose portion.

The retainer washer 114 and nose portion 108 act to bias the roller bearings 102 and 110 toward each other and against the faces of the shoulder 100 of the bore 98.

The disclosed devices are thus seen to represent a distinct advance and improvement in the field of mechanical oscillators.

Variations and modifications are possible without departing from the spirit of the invention.

Each and every one of the appended claims defines an aspect of the invention which is separate and distinct from all others, and accordingly it is intended that each claim be treated as such, when examined in the light of the prior art devices in any determination of novelty or validity.

What is claimed is:

1. A heavy-duty mechanical oscillator comprising, in combination:
   a) a shaft having a pair of axially-spaced endless cam grooves in its periphery, said grooves being identical but circumferentially oriented 180 degrees apart,
   b) a nut body carried by and slidable along the peripheral portion of said shaft,
   c) a pair of axially-spaced roller pins carried by said nut body and circumferentially oriented 180 degrees apart, said roller pins having nose portions respectively extending into and engaging walls of said endless grooves and having tail portions disposed deeply in the nut body,
   d) said nose portions being conical whereby the roller pins are subjected to loading comprised of both radial and axial components,
   e) two sets of paired anti-friction roller bearings carried by the nut body, each pair of bearings respectively carrying one roller pin,
   f) said pairs of anti-friction bearings each comprising a primary tapered roller bearing disposed adjacent the nose portion of its respective roller pin and oriented to counter high radial forces and lesser axial forces experienced by said nose portion and with respect to the roller pin axis, and a secondary tapered roller bearing located adjacent the said primary bearing and engaged with a tail portion of the roller pin,
   g) said secondary roller bearing being oriented to mainly counter radial forces experienced by the nose portion of its respective roller pin and with respect to the roller pin axis.

2. A heavy-duty mechanical oscillator as set forth in claim 1, and further including:
   a) spring means biasing said roller bearings toward each other,
   b) carrier blocks having transverse bores in which the roller bearings are carried,
   c) said blocks having in said transverse bores annular shoulder portions which are disposed intermediate the ends of the transverse bores and which shoulder portions are interposed between the primary and secondary bearings,
   d) said spring means comprising shank portions of the roller pins and spring washers carried by said shank portions and engaging the said secondary bearings, respectively.

3. A heavy-duty mechanical oscillator as set forth in claim 1, and further including:
   a) carrier blocks on said nut body,
   b) said primary bearings having outer races which are solidly backed by said blocks, respectively.

4. A heavy-duty mechanical oscillator comprising, in combination:
   a) a shaft having two sets of multiple, parallel axially-spaced endless cam grooves in its periphery, said sets of grooves being identical but circumferentially oriented 180 degrees apart,
   b) a nut body carried by and slidable along the peripheral portion of said shaft,
   c) two sets of axially-aligned and axially-spaced roller pins carried by said nut body, said sets being circumferentially oriented 180 degrees apart, said roller pins having nose portions respectively extending into and engaging walls of respective endless grooves and having tail portions disposed deeply in the nut body,
   d) said nose portions being conical whereby the roller pins are subjected to loading comprised of both radial and axial components,
   e) two sets of paired anti-friction roller bearings carried by the nut body, each pair of bearings respectively carrying one roller pin,
   f) said sets of paired bearings being axially spaced apart and being circumferentially oriented 180 degrees apart,
   g) the pairs of each bearing set being axially aligned with each other and each comprising a primary tapered roller bearing disposed adjacent the nose portion of its respective roller pin and oriented to counter high radial forces and lesser axial forces experienced by said nose portion and with respect to the roller pin axis, and a secondary tapered roller bearing located adjacent the said primary bearing and engaged with a tail portion of the roller pin, h) said secondary roller bearing being oriented to counter mainly radial forces experienced by said nose portion and with respect to the roller pin axis.

5. A heavy-duty mechanical oscillator as set forth in claim 4, wherein:
   a) said nut body has a pair of carrier blocks on opposite, 180 degree circumferentially-displaced portions of said nut body,
   b) the primary and secondary bearings of said sets being carried respectively by said carrier blocks.

6. A heavy-duty mechanical oscillator as set forth in claim 5, wherein:
   a) said primary bearings are solidly backed by said carrier blocks.

7. A heavy-duty mechanical oscillator as set forth in claim 6, wherein:
   a) said carrier blocks have transverse bores in which the bearing pairs are carried,
   b) said blocks having annular shoulder portions in said transverse bores, interposed between the pairs of the bearings, and
   c) spring means biasing the bearings of the pairs respectively toward each other and against the said annular shoulder portions.

8. A heavy-duty mechanical oscillator as set forth in claim 4, wherein:
   a) the shaft has six cam grooves in each set,
   b) each set of roller pins comprises six pins engaged respectively in the said six cam grooves, and
   c) said sets of paired bearings comprise six pairs in each set.

9. A heavy-duty mechanical oscillator comprising, in combination:
   a) a shaft having an endless cam groove in its periphery,
   b) a nut body carried by and slidable along the peripheral portion of said shaft,
   c) a roller pin carried by said nut body, having a nose portion extending into and engaging a wall of the said endless groove and having a tail portion disposed deeply in the nut body,
   d) said nose portion being conical whereby the roller pin is subjected to loading comprised of both radial and axial components,
   e) paired anti-friction roller bearings carried by the nut body, said bearings carrying the said roller pin,
   f) said anti-friction bearings comprising a primary tapered roller bearing disposed adjacent the nose portion of the roller pin and oriented to counter high radial forces and lesser axial forces experienced by the nose portion of its respective roller pin, and with respect to the roller pin axis, and a secondary tapered roller bearing located adjacent the said primary bearing and engaged with a tail portion of the roller pin,
   g) said secondary roller bearing being oriented to counter mainly radial forces experienced by said nose portion and with respect to the roller pin axis,
   h) said nut body having a transverse bore in which the primary and secondary bearings are disposed in side-by-side relation,
   i) said body having an annular shoulder portion located intermediate the ends of said transverse bore,
   j) said bearings being engaged with said annular shoulder portion,
   k) spring means biasing said bearings toward, and maintaining them engaged with said shoulder portion,
   l) the tail portion of the roller pin comprising a smooth shank on which the paired roller bearings are carried, and
   m) said secondary roller bearing having an annular exterior flange which is engaged with nut body to position it in said transverse bore.

10. A heavy-duty mechanical oscillator as set forth in claim 9, wherein:
   a) said spring means engages the said secondary roller bearing.

* * * * *